United States Patent [19]

Mori

[11] Patent Number: 4,711,408

[45] Date of Patent: Dec. 8, 1987

[54] WEBBING WIND-UP FORCE LIMITING APPARATUS

[75] Inventor: Shinji Mori, Aichi, Japan

[73] Assignee: Kabushiki Kaisha Tokai-Rika-Denki-Seisakusho, Japan

[21] Appl. No.: 2,976

[22] Filed: Jan. 13, 1987

[30] Foreign Application Priority Data

Jan. 14, 1986 [JP] Japan ............................... 61-3439[U]

[51] Int. Cl.$^4$ ............................................ B60R 22/44
[52] U.S. Cl. ............................... 242/107; 242/107.4 R
[58] Field of Search ......... 242/107, 107.4 R, 107.4 A, 242/107.4 B; 280/807, 806; 297/478, 480, 475

[56] References Cited

U.S. PATENT DOCUMENTS 4,162,772 7/1979 Mori .................................. 242/107

FOREIGN PATENT DOCUMENTS 11425 1/1978 Japan .................................. 242/107
129653 8/1984 Japan .

Primary Examiner—John M. Jillions
Attorney, Agent, or Firm—Sixbey, Friedman & Leedom

[57] ABSTRACT

A webbing wind-up force limiting apparatus for use in a webbing retractor wherein a pair of webbing take-up resilient members are connected together through a gear wheel and the webbing wind-up force is reduced by locking the rotation of the gear wheel. The apparatus includes a rotary member whose diameter is enlarged by an inertia member in response to the rotation of the gear wheel when the occupant unfastens the webbing, and a ring which comes into contact with the rotary member when its diameter is enlarged. Accordingly, when the occupant unfastens the webbing, the gear wheel is prevented from rotating rapidly.

18 Claims, 8 Drawing Figures

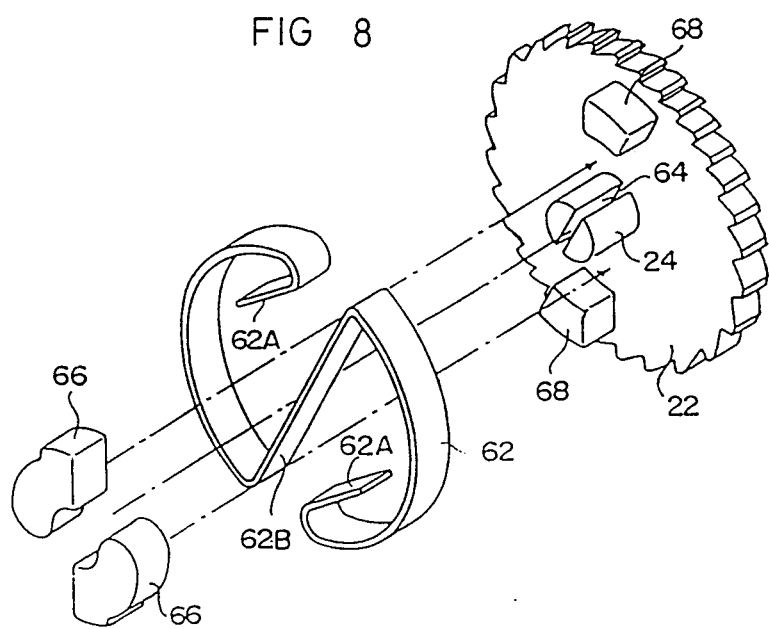

WEBBING WIND-UP FORCE LIMITING APPARATUS

BACKGROUND OF THE INVENTION

1. Field of the Invention

The present invention relates to a webbing wind-up force limiting apparatus for use in a seatbelt system for a vehicle designed to protect an occupant in an emergency situation of the vehicle, the apparatus being capable of appropriately limiting the force applied to an occupant restraining webbing in order to wind it up.

2. Description of the Related Art

In general seatbelt systems for vehicles, a webbing for fastening the body of an occupant is wound up into a retractor, and this involves the problem that a resilient member for winding up the webbing causes the occupant to feel pressure from the webbing.

To solve such problem, there have heretofore been proposed various webbing wind-up force limiting apparatuses designed to prevent the webbing wind-up force from acting on the webbing when the occupant has it fastened, or to reduce the webbing wind-up force when the occupant is in a webbing fastened condition.

This type of webbing wind-up force limiting apparatus is generally arranged such that a pair of webbing take-up resilient members are connected together through a gear wheel, and after the occupant has fastened the webbing, a pawl is engaged with the gear wheel to lock the latter from rotating, and the biasing force from one resilient member alone is transmitted to the webbing (see, for example, Japanese Utility Model No. 129653/1984).

However, the webbing wind-up force limiting apparatus of the type described above suffers from the following problems. When the occupant unfastens the webbing and the gear wheel is allowed to rotate, a relatively strong biasing force is transmitted from one resilient member to the other, causing the gear wheel to rotate rapidly, and as the resilient member which has a relatively strong biasing force is rapidly unwound, the resilient member which has a relatively weak biasing force is rapidly rewound, and this leads to generation of noise.

A seat belt retaining and winding device for overcoming such problems has been proposed in U.S. Pat. No. 4,162,772. However, the device has a complicated structure, which results in increase in manufacturing cost and manufacturing steps.

SUMMARY OF THE INVENTION

In view of the above-described circumstances, it is an object of the present invention to provide a webbing wind-up force limiting apparatus which has a simplified structure but in which the gear wheel is prevented from rotating rapidly when it is unlocked, thereby enabling prevention of generation of noise.

To this end, the present invention provides a webbing wind-up force limiting apparatus for use in a seatbelt system for a vehicle designed to restrain the body of an occupant in an emergency situation of the vehicle, comprising: a pair of webbing take-up resilient members for biasing a take-up shaft for winding up an occupant restraining webbing in a direction in which the webbing is rewound; a gear wheel interposed between the pair of webbing take-up resilient members; a rotary member rotated together with the gear wheel and enlarged in diameter when the gear wheel rotates in the webbing rewinding direction; an inertia member causing the diameter of the rotary member to be enlarged when the gear wheel rotates in the webbing rewinding direction; and resistance applying means coming into contact with the rotary member when its diameter is enlarged to apply resistance to the rotation of the gear wheel.

By virtue of the above-described arrangement, when the occupant unfastens the webbing and the gear wheel is thereby allowed to rotate and consequently one resilient member is rewound by means of the biasing force from the other resilient member, the gear wheel is locked from rotating rapidly, and there is therefore no fear of noise being generated.

The above and other objects, features and advantages of the present invention will become more apparent from the following description of the preferred embodiments thereof, taken in conjunction with the accompanying drawings.

BRIEF DESCRIPTION OF THE DRAWINGS

FIG. 8 is an exploded perspective view of the third embodiment.

DESCRIPTION OF THE PREFERRED EMBODIMENTS

Figure 1:
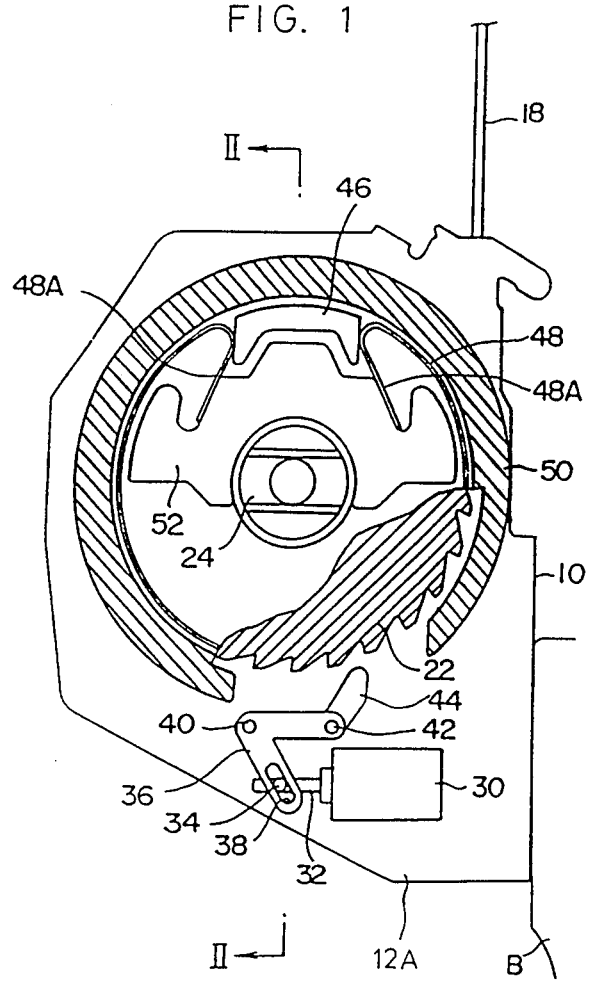
FIG. 1 is a side view of one embodiment of the webbing wind-up force limiting apparatus according to the present invention.
Figure 2:
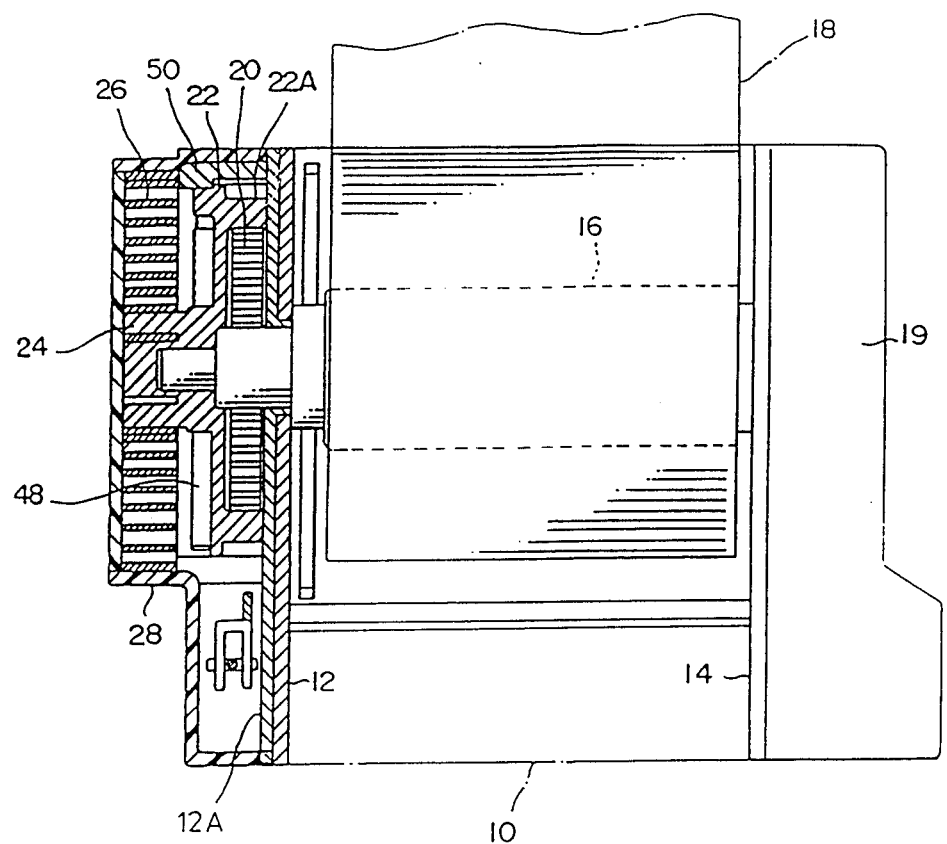
FIG. 2 is a sectional view taken along the line II—II in FIG. 1.
Figure 3:
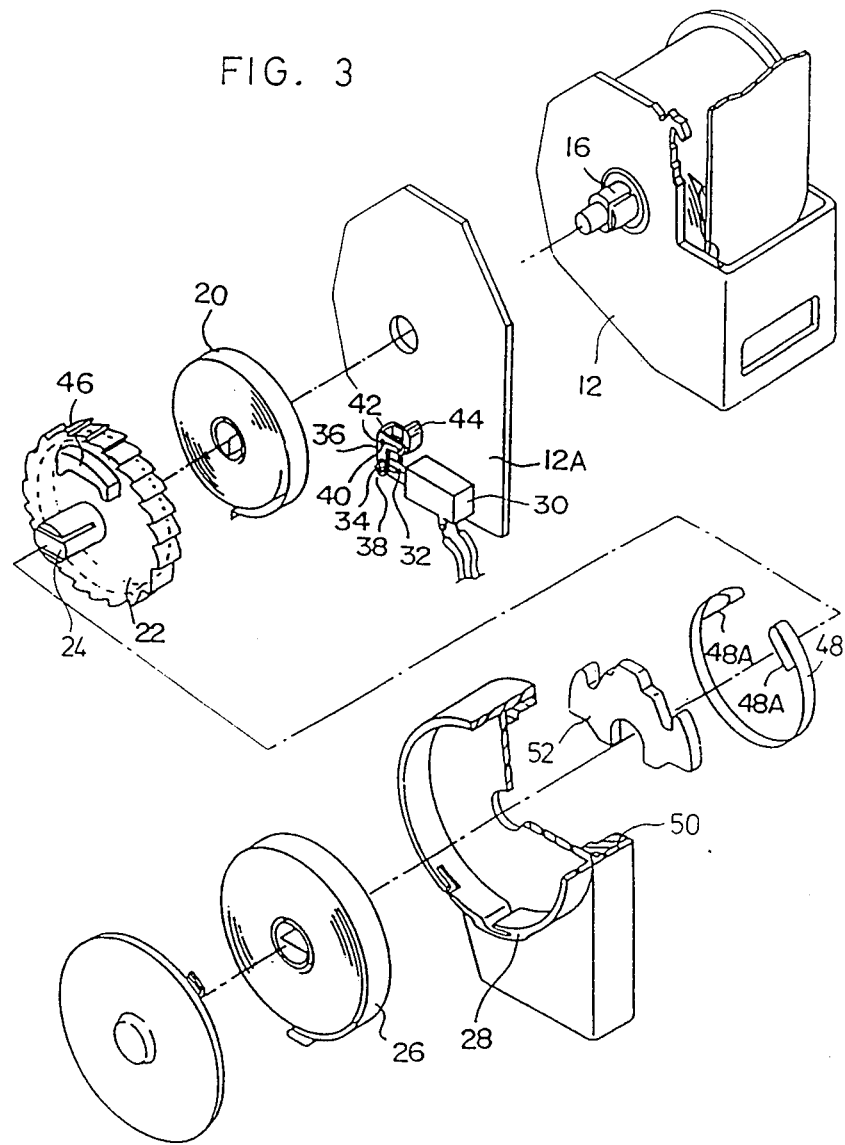
FIG. 3 is an exploded perspective view of the first embodiment.

FIGS. 1 to 4 show in combination one embodiment of the present invention in which the invention is applied to a webbing retractor.

A frame 10 is secured to a vehicle body B. A pair of parallel leg plates 12 and 14 project from two sides, respectively, of the frame 10, and a take-up shaft 16 is rotatably supported by the leg plates 12 and 14. One end of a webbing 18 is wound up in layers on the central portion of the take-up shaft 16. A tongue plate (not shown) is supported by the other end of the webbing 18. By engaging this tongue plate with a buckle device secured to the vehicle body B, the occupant can be fastened with the intermediate portion of the webbing 18.

The retractor incorporates an inertia type lock mechanism 19 for stopping the take-up shaft 16 from rotating in a direction in which the webbing 18 is unwound when an emergency situation of the vehicle occurs, the lock mechanism 19 being provided on the outer side of the leg plate 14.

One end portion of the take-up shaft 16 projects from the leg plate 12, and the inner end of a relatively small spiral spring 20 is retained by the projecting end portion of the take-up shaft 16. The outer end of the spring 20 is retained by the inner periphery of a tubular portion 22A of a gear wheel 22 which is coaxially and rotatably supported by the take-up shaft 16.

The gear wheel 22 has a boss 24 which projects coaxially with the take-up shaft 16, and the inner end of a relatively large spiral spring 26 is retained by the boss 24. The outer end of the spring 26 is secured to the inner peripheral surface of a cover 28 which is rigidly secured to the outer side of the leg plate 12. Thus, the small and large spiral springs 20 and 26 are connected in series to each other through the gear wheel 22 which is interposed at the connection therebetween.

A solenoid 30 is secured to a base plate 12A which, in turn, is secured to the outer side of the leg plate 12, so that, when the occupant engages the tongue plate with the buckle device in order to fasten the webbing 18, an actuator 32 can be withdrawn by means of the magnetic force from the solenoid 30. A pin 34 projects at right angles from the distal end portion of the actuator 32, the pin 34 being inserted into a slot 38 provided in one end portion of an arm 36.

The arm 36 is pivotally supported through a pin 40 by the base plate 12A which is secured to the leg plate 12. A pawl 44 is pivotally supported by the other end portion of the arm 36 through a pin 42. The pawl 44 is biased toward the outer periphery of the gear wheel 22 by means of the force from a resilient member (not shown). The arrangement is such that, when the actuator 32 is withdrawn by the action of the solenoid 30, the pawl 44 is engaged with the outer periphery of the gear wheel 22, thus locking the gear wheel 22 from rotating in a direction in which the webbing 18 is rewound. The pawl 44, the arm 36, the actuator 32 and the solenoid 30 constitute in combination a gear wheel locking means.

Accordingly, when the pawl 44 is in engagement with the gear wheel 22, no wind-up force from the large spiral spring 26 acts on the take-up shaft 16, but the wind-up force from the small spiral spring 20 alone acts thereon, thereby allowing the occupant to maintain driving comfort.

Figure 4:
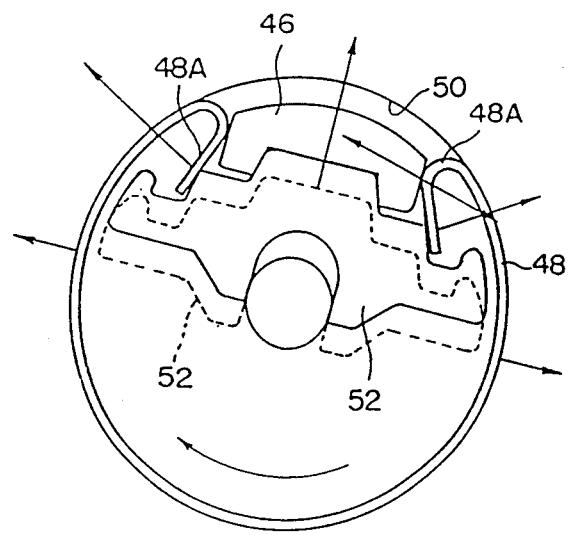
FIG. 4 shows an essential part of the first embodiment, which is employed to describe the operation thereof.

The gear wheel 22 has a projection 46 which is integral therewith and which projects therefrom toward the large spiral spring 26. Two axial end portions of a leaf spring 48 which defines a rotary member face two ends, respectively, of the projection 46. More specifically, as shown in FIG. 4, the leaf spring 48 is bent in a substantially C-shape, while both end portions 48A of the C-shaped leaf spring 48 are bent in a U-shape, and the U-shaped bent end portions 48A face the two ends, respectively, of the projection 46.

The outer peripheral portion of the C-shaped portion of the leaf spring 48 faces the inner peripheral surface of a ring 50 which is rigidly secured to the cover 28, the ring 50 defining a resistance applying means. The outer diameter of the C-shaped portion of the leaf spring 48 is made slightly smaller than the inner diameter of the ring 50, so that the gear wheel 22 can readily rotate together with the leaf spring 48 which is pushed at either one of the end portions 48A by the projection 46.

The boss 24 of the gear wheel 22 has an inertia member 52 provided at the outer periphery thereof. The inertia member 52 is clamped between both end portions 48A of the leaf spring 48. One end of the inertia member 52 is brought into contact with the outer periphery of the boss 24 by means of the biasing force applied from the end portions 48A of the spring 48, and consequently the other end of the inertia member 52 is slightly spaced away from the projection 46.

However, when the gear wheel 22 rotates rapidly, centrifugal force acts in the radial direction of the gear wheel 22, causing the inertia member 52 to move in a direction in which both end portions 48A of the leaf spring 48 move away from each other, that is, the diameter of the C-shaped portion of the leaf spring 48 is enlarged. In consequence, the leaf spring 48 is brought into friction contact with the inner peripheral surface of the ring 50, thus limiting the rotation of the gear wheel 22.

The operation of this embodiment will be explained below.

When the webbing 18 is not fastened to the occupant's body, the solenoid 30 is not excited. Accordingly, the gear wheel 22 is allowed to rotate, and the take-up shaft 16 is therefore subjected to the biasing forces from both the small and large spiral springs 20 and 26.

When the occupant fastens the webbing 18, the solenoid 30 is excited, and the actuator 32 is thereby activated to pivot the arm 36, thus causing the pawl 44 to engage with the gear wheel 22. Accordingly, the gear wheel 22 blocks the transmission of the biasing force from the large spiral spring 26, and the biasing force from the small spiral spring 20 alone is allowed to act on the take-up shaft 16. Thus, the occupant receives only the relatively weak biasing force from the small spiral spring 20 through the webbing 18 and can maintain driving comfort.

When the occupant unfastens the webbing 18, the gear wheel 22 is allowed to rotate. Accordingly, the gear wheel 22, which is subjected to the relatively strong biasing force from the large spiral spring 26, rotates rapidly to rewind the small spiral spring 20. At this time, in the prior art arrangement, noise is generated by the rapidly rotating gear wheel 22 and the small spiral spring 20 which is being rapidly rewound.

However, in this embodiment, when the gear wheel 22 rotates rapidly, the inertia member 52 pushes both end portions 48A of the leaf spring 48 so as to enlarge the outer diameter thereof. Accordingly, the leaf spring 48 comes into friction contact with the ring 50, and the rotation of the gear wheel 22 is thereby limited. Therefore, there is no fear of the gear wheel 22 and the small spiral spring 20 being rapidly rotated and rewound, respectively, but they operate relatively slowly and gently, so that no noise is generated. However, the biasing force from the large spiral spring 26 is reliably applied to the take-up shaft 16 through the gear wheel 22, and the webbing 18 is thereby reliably rewound onto the take-up shaft 16.

Figure 5:
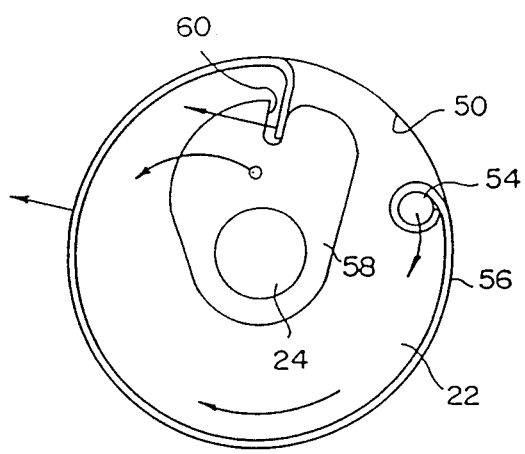
FIG. 5 is a side view of a second embodiment of the present invention, which corresponds to FIG. 1.
Figure 6:
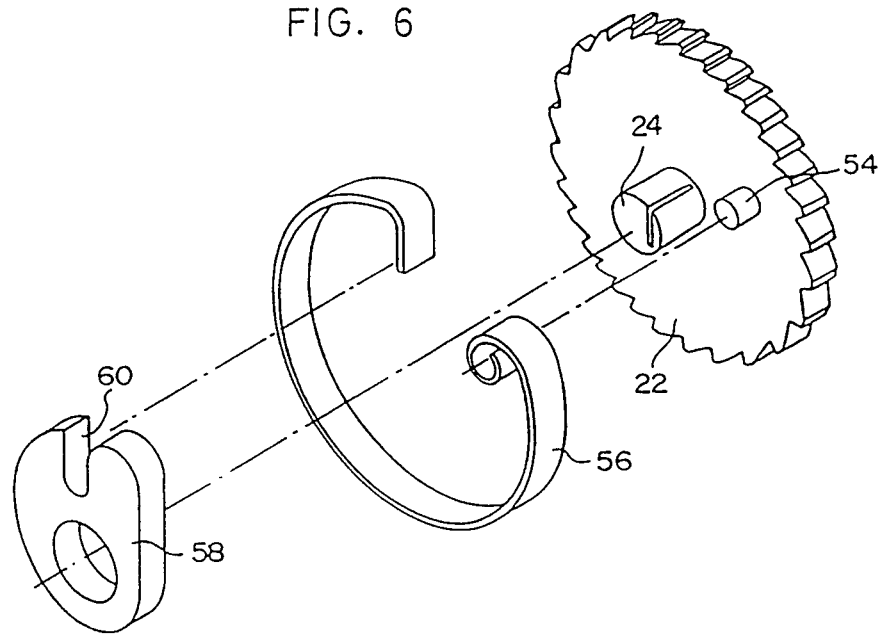
FIG. 6 is an exploded perspective view of the second embodiment.

Referring next to FIGS. 5 and 6, there is shown a second embodiment of the present invention.

In this embodiment, a pin 54 projects from the gear wheel 22 to support one end of a leaf spring 56. The leaf spring 56 is bent at its intermediate portion in a substantially C-shape in a manner similar to that in the above-described embodiment. The other end of the leaf spring 56 is bent so as to extend toward the boss 24 and received in a recess 60 provided in an inertia plate 58 which is pivotally supported on the outer periphery of the boss 24.

Thus, in this embodiment, when the gear wheel 22 rotates rapidly in the clockwise direction as viewed in FIG. 5 when the webbing 18 is rewound, the rotation of the inertia plate 58 is delayed with respect to the rotation of the boss 24, thus causing the outer diameter of the leaf spring 56 to be enlarged. Accordingly, the leaf spring 56 is brought into contact with the ring 50, thereby stopping the rapid rotation of the gear wheel 22, and thus providing advantages similar to those which are offered by the first embodiment.

Figure 7:
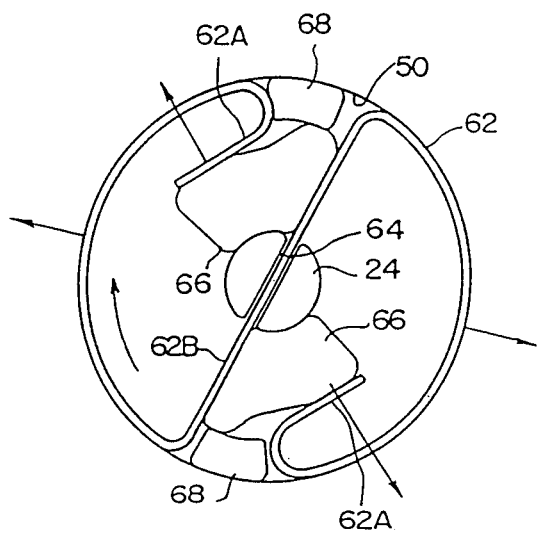
FIG. 7 is a side view of a third embodiment of the present invention, which corresponds to FIG. 1.

FIGS. 7 and 8 show in combination a third embodiment of the present invention.

In this embodiment, the intermediate portion 62B of a leaf spring 62 is disposed within a groove 64 provided in the boss 24. Two axial end portions of the leaf spring 62 are each bent in a substantially C-shape so as to face the inner peripheral surface of the ring 50. The distal end portion 62A of each C-shaped portion of the leaf spring 62 is bent in a U-shape, and an inertia member 66 is interposed between each distal end portion 62A and the intermediate portion 62B of the leaf spring 62.

Accordingly, when centrifugal force acts on the inertia members 66 when the gear wheel 22 rotates rapidly, the distal end portions 62A are moved away from the intermediate portion 62B of the leaf spring 62, thus causing the outer diameter of the C-shaped portions to be enlarged. Thus, the leaf spring 62 is brought into contact with the ring 50 to limit the rotation of the gear wheel 22 in a way similar to that in the above-described embodiments.

It should be noted that projections 68 are formed integral with the gear wheel 22 so as to project from outer peripheral portions, respectively, of the gear wheel 22 in order to limit any unnecessary outward movement of the inertia members 66.

The present invention is not necessarily limitative to the above-described embodiments and may be applied to any arrangement which includes a rotary member whose diameter is enlarged when the gear wheel rotates rapidly and a member having an inner peripheral surface which comes into contact with the rotary member when its diameter is enlarged to limit the rotation of the gear wheel.

What is claimed is:

1. A webbing wind-up force limiting apparatus for use in a seatbelt system for a vehicle designed to restrain the body of an occupant in an emergency situation of the vehicle, comprising:
    a pair of webbing take-up resilient members for biasing a take-up shaft for winding up an occupant restraining webbing in a direction in which said webbing is rewound;
    a gear wheel interposed between said pair of webbing take-up resilient members;
    a rotary member rotated together with said gear wheel and enlarged in diameter when said gear wheel rotates in the webbing rewinding direction;
    an inertia member causing the diameter of said rotary member to be enlarged when said gear wheel rotates in the webbing rewinding direction; and
    resistance applying means coming into contact with said rotary member when its diameter is enlarged to apply resistance to the rotation of said gear wheel.

2. A webbing wind-up force limiting apparatus according to claim 1, further comprising:
    gear wheel locking means for locking said gear wheel from rotating in the webbing rewinding direction when the occupant has said webbing fastened, said gear wheel locking means allowing said gear wheel to rotate in the webbing rewinding direction when the occupant unfastens said webbing.

3. A webbing wind-up force limiting apparatus according to claim 2, wherein said rotary member is defined by a leaf spring bent in a substantially C-shape, said resistance applying means being defined by a ring disposed at the outer peripheral portion of said leaf spring, and said inertia member being disposed inside said leaf spring.

4. A webbing wind-up force limiting apparatus according to claim 3, wherein each of the axial end portions of said leaf spring is bent in a U-shape, said gear wheel having a projection which faces said U-shaped bent portions in the direction of rotation of said gear wheel, so that said leaf spring is rotated together with said gear wheel.

5. A webbing wind-up force limiting apparatus according to claim 4, wherein said inertia member is clamped between said U-shaped bent portions and brought into contact with the outer periphery of a boss formed at the axial center of said gear wheel.

6. A webbing wind-up force limiting apparatus according to claim 2, wherein said rotary member is defined by a leaf spring bent in a substantially C-shape, said resistance applying mans being defined by a ring disposed at the outer peripheral portion of said leaf spring, said inertia member being defined by an inertia plate pivotally supported at a position offset from its center of gravity by the outer periphery of a boss formed at the axial center of said gear wheel, and said leaf spring being retained at one end thereof by said gear wheel and at the other end thereof by said inertia plate.

7. A webbing wind-up force limiting apparatus according to claim 2, wherein said rotary member is defined by a leaf spring bent in a substantially S-shape and having both axial end portions thereof bent in a U-shape, said resistance applying means being defined by a ring disposed at the outer peripheral portion of said leaf spring, and said inertia member being defined by a pair of inertia members disposed between the outer periphery of a boss formed at the axial center of said gear wheel and said U-shaped bent portions, respectively.

8. A webbing wind-up force limiting apparatus according to claim 2, wherein said gear wheel locking means includes a pawl engageable with teeth of said gear wheel, and an actuator which activates said pawl to engage with the teeth of said gear wheel when the occupant has said webbing fastened and which activates said pawl to disengage from said teeth when the occupant unfastens said webbing.

9. A webbing wind-up force limiting apparatus for use in a webbing retractor for a vehicle designed to wind up a webbing for restraining the body of an occupant in an emergency situation of the vehicle, comprising:
    a first spring retained at one end thereof by a take-up shaft for winding up said webbing, said first spring biasing said take-up shaft in a direction in which said webbing is rewound;
    a gear wheel retaining the other end of said first spring and rotatably supported by said take-up shaft, said gear wheel having a fitting portion provided in the outer periphery thereof;
    a second spring retained at one end thereof by said gear wheel to bias said gear wheel in a direction in which said webbing is rewound, said second spring having a greater biasing force than that of said first spring;
    gear wheel locking means for locking said gear wheel from rotating in the webbing rewinding direction when the occupant has said webbing fastened, said gear wheel locking means allowing said gear wheel to rotate in the webbing rewinding direction when the occupant unfastens said webbing;

a rotary member rotated together with said gear wheel and enlarged in diameter when said gear wheel rotates in the webbing rewinding direction;

an inertia member causing the diameter of said rotary member to be enlarged when said gear wheel rotates in the webbing rewinding direction; and resistance applying means coming into slide contact with said rotary member when its diameter is enlarged to apply resistance to the rotation of said gear wheel.

10. A webbing wind-up force limiting apparatus according to claim 9, wherein said resistance applying means is defined by a ring rigidly secured to a cover which, in turn, is rigidly secured to a leg plate of a frame for rotatably supporting said webbing take-up shaft and which retains the other end of said second spring, said ring being disposed at the outer peripheral portion of said rotary member.

11. A webbing wind-up force limiting apparatus according to claim 10, wherein said rotary member is defined by a leaf spring bent in a substantially C-shape, and said inertia member being disposed inside said leaf spring, so that the diameter of said leaf spring is enlarged by means of centrifugal force which acts on said inertia member when said gear wheel rotates in the webbing rewinding direction, and said leaf spring is thereby brought into slide contact with said ring.

12. A webbing wind-up force limiting apparatus according to claim 11, wherein each of the axial end portions of said leaf spring is bent in a U-shape, said gear wheel having a projection which faces said U-shaped bent portions in the direction of rotation of said gear wheel, so that said leaf spring is rotated together with said gear wheel.

13. A webbing wind-up force limiting apparatus according to claim 12, wherein said inertia member is clamped between said U-shaped bent portions and brought into contact with the outer periphery of a boss formed at the axial center of said gear wheel.

14. A webbing wind-up force limiting apparatus according to claim 11, wherein said inertia member is defined by an inertia plate pivotally supported at a position offset from its center of gravity by the outer periphery of a boss formed at the axial center of said gear wheel, and said leaf spring being retained at one end thereof by said gear wheel and at the other end thereof by said inertia plate.

15. A webbing wind-up force limiting apparatus according to claim 10, wherein said rotary member is defined by a leaf spring bent in a substantially S-shape and having both axial end portions thereof bent in a U-shape, said inertia member being defined by a pair of inertia members disposed between the outer periphery of a boss formed at the axial center of said gear wheel and said U-shaped bent portions, respectively.

16. A webbing wind-up force limiting apparatus for use in a webbing retractor for a vehicle designed to wind up a webbing for restraining the body of an occupant in an emergency situation of the vehicle, comprising:

a relatively small spiral spring retained at its inner end by a take-up shaft which is rotatably supported by a frame rigidly secured to the vehicle to wind up said webbing, said small spiral spring biasing said take-up shaft in a direction in which said webbing is rewound;

a gear wheel retaining the outer end of said small spiral spring and rotatably supported by one end portion of said take-up shaft, said gear wheel having teeth formed on the outer peripheral portion thereof;

a relatively large spiral spring retained at its inner end by a boss formed on said gear wheel to bias said gear wheel in a direction in which said webbing is rewound, said large spiral spring having greater biasing force than that of said small spiral spring;

a pawl pivotally supported by said frame, said pawl being activated by drive means so that, when the occupant has said webbing fastened, said pawl is engaged with the teeth of said gear wheel, whereas, when the occupant unfastens said webbing, said pawl is disengaged from said teeth;

a rotary member rotated together with said gear wheel and enlarged in diameter when said gear wheel rotates in the webbing rewinding direction;

a ring rigidly secured to a cover which retains the outer end portion of said large spiral spring and which is rigidly secured to said frame, said ring being positioned at the outer peripheral portion of said rotary member; and an inertia member causing the diameter of said rotary member to be enlarged when said gear wheel rotates in the webbing rewinding direction, thus bringing said rotary member into slide contact with said ring.

17. A webbing wind-up force limiting apparatus according to claim 16, wherein said rotary member is defined by a bent leaf spring.

18. A webbing wind-up force limiting apparatus according to claim 17, wherein said drive means includes a solenoid, an actuator driven by excitation of said solenoid, and an arm retained at one end thereof by said actuator and at the other end thereof by said pawl.

* * * * *